(12) United States Patent
Graf

(10) Patent No.: US 7,949,454 B2
(45) Date of Patent: May 24, 2011

(54) DRIVING DYNAMICS CONTROL SYSTEM HAVING AN EXPANDED BRAKING FUNCTION

(75) Inventor: Gerald Graf, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 1138 days.

(21) Appl. No.: 11/598,937

(22) Filed: Nov. 13, 2006

(65) Prior Publication Data

US 2007/0219699 A1 Sep. 20, 2007

(30) Foreign Application Priority Data

Nov. 11, 2005 (DE) .......................... 10 2005 053 864

(51) Int. Cl.
*G06G 7/00* (2006.01)
*G06G 7/76* (2006.01)

(52) U.S. Cl. .......... 701/70; 180/282; 477/183; 477/188; 303/189

(58) Field of Classification Search ............... 701/70–72, 701/42, 83; 303/187, 112, 312, 189; 180/197, 180/411, 282; 477/183–188
See application file for complete search history.

(56) References Cited

U.S. PATENT DOCUMENTS

| | | | |
|---|---|---|---|
| 5,251,719 A * | 10/1993 | Eto et al. .................... | 180/197 |
| 5,258,912 A * | 11/1993 | Ghoneim et al. ............... | 701/42 |
| 5,737,714 A | 4/1998 | Matsuno et al. | |
| 5,862,503 A * | 1/1999 | Eckert et al. ................... | 701/78 |
| 6,089,677 A | 7/2000 | Fukumura et al. | |
| 6,263,261 B1 * | 7/2001 | Brown et al. ................... | 701/1 |
| 6,312,065 B1 * | 11/2001 | Freitag et al. ................ | 303/187 |
| 6,338,012 B2 * | 1/2002 | Brown et al. ................... | 701/1 |
| 6,895,318 B1 * | 5/2005 | Barton et al. .................. | 701/42 |
| 7,027,903 B2 * | 4/2006 | Meyers et al. ................. | 701/38 |
| 7,130,735 B2 * | 10/2006 | Brown et al. ................... | 701/70 |
| 7,169,083 B2 * | 1/2007 | Sawada et al. ............... | 477/183 |
| 2004/0046448 A1 | 3/2004 | Brown | |
| 2004/0262067 A1 * | 12/2004 | Sawada et al. ............... | 180/282 |

FOREIGN PATENT DOCUMENTS

| | | |
|---|---|---|
| DE | 195 15 061 | 5/1996 |
| DE | 196 03 427 | 8/1996 |
| GB | 2 325 500 | 11/1998 |

OTHER PUBLICATIONS

Motorcycle modeling for high-performance maneuvering; Hauser, J.; Saccon, A.; Control Systems Magazine, IEEE; vol. 26, Issue 5, Oct. 2006 pp. 89-105; Digital Object Identifier 10.1109/MCS.2006.1700047.*

(Continued)

*Primary Examiner* — Cuong H Nguyen
(74) *Attorney, Agent, or Firm* — Kenyon & Kenyon LLP

(57) ABSTRACT

In a method for stabilizing a vehicle in extreme driving situations, in particular when understeering while cornering, multiple wheels are decelerated in order to reduce the driving speed. A maximum cornering force of the wheels and thus a minimal curve radius may be achieved if in particular the rear wheels are decelerated and a higher braking torque is applied on the rear wheels than on the front wheels and in the process in particular the outside front wheel remains highly underdecelerated.

8 Claims, 3 Drawing Sheets

OTHER PUBLICATIONS

Electric Braking Control Methods for Electric Vehicles With Independently Driven Front and Rear Wheels; Mutoh, N.; Hayano, Y.; Yahagi, H.; Takita, K.; Industrial Electronics, IEEE Transactions on, vol. 54, Issue 2, Apr. 2007 pp. 1168-1176 Digital Object Identifier 10.1109/TIE.2007.892731.*

Adaptive vehicle traction force control for intelligent vehicle highway systems (IVHSs); Hyeongcheol Lee; Tomizuka, M.; Industrial Electronics, IEEE Transactions on, vol. 50, Issue 1, Feb. 2003 pp. 37-47, Digital Object Identifier 10.1109/TIE.202.807677.*

Driving characteristics of an electric vehicle system with independently driven front and rear wheels; Mutoh, N.; Kazama, T.; Takita, K.; Industrial Electronics, IEEE Transactions on, vol. 53, Issue 3, Jun. 2006 pp. 803-813 Digital Object Identifier 10.1109/TIE.2006.874271.*

Wheel torque proportioning, rear steering, and normal force control: a structural investigation; Unyelioglu, K.A.; Ozguner, U.; Hissong, T.; Winkelman, J.; Automatic Control, IEEE Transactions on, vol. 42, Issue 6, Jun. 1997 pp. 803-818 Digital Object Identifier 10.1109/9.587334.*

A Nonlinear Semiactive Rear Differential Control in Rear Wheel Drive Vehicles; Marino, R.; Stefano, S.; Fabio, C.; Control Conference, 2007. CCC 2007. Chinese; Digital Object Identifier: 10.1109/CHICC.2006.4347527 Publication Year: 2007, pp. 597-602.*

Analysis of Vehicle Handling and Stability in Frequency Domain Based on System Identification Method; Wu Changshui; Yuan Ming; Gong Yuanming; Qian Yu Bin; Information Engineering (ICIE), 2010 WASE International Conference on vol. 3; Digital Object Identifier: 10.1109/ICIE.2010.264; Publication Year: 2010, pp. 365-368.*

\* cited by examiner

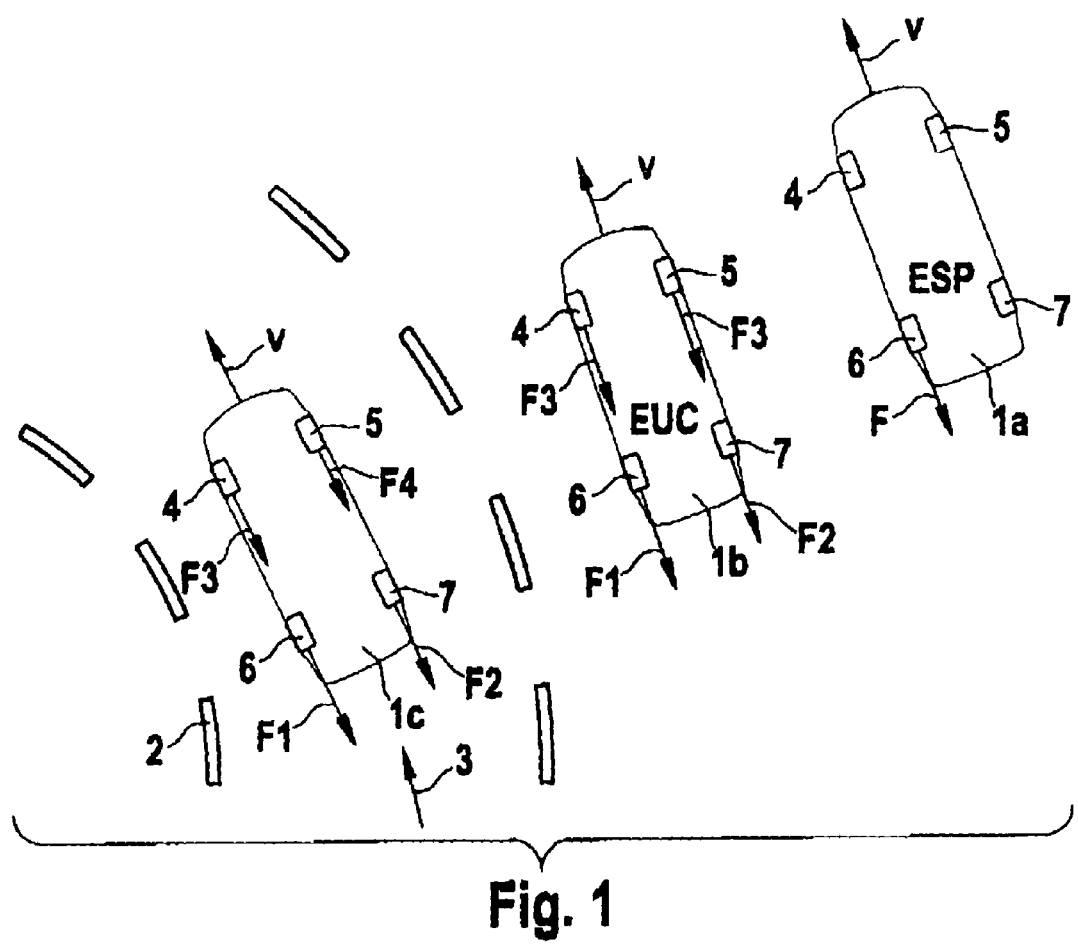
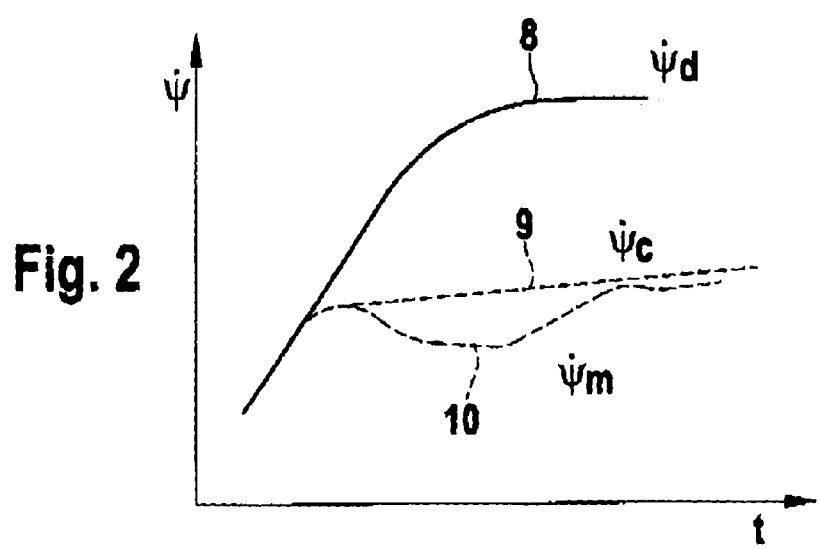

DRIVING DYNAMICS CONTROL SYSTEM HAVING AN EXPANDED BRAKING FUNCTION

BACKGROUND OF THE INVENTION

1. Field of the Invention

The present invention relates to a method and a device for stabilizing a vehicle in extreme driving situations, e.g., when understeering while cornering.

2. Description of Related Art

Driving dynamics control systems such as ESP or DSC, for example, are used to improve the controllability of motor vehicles in critical driving situations, e.g. when oversteering or understeering in cornering, and to stabilize the vehicle. Known systems include a sensor system, which records measured values about the current driving condition of the vehicle, a control unit having a control algorithm for performing a sideslip angle and/or yaw rate control, and at least one actuator for influencing the driving behavior of the vehicle. Various setpoint variables are calculated from the driver input, in particular the steering wheel position and the accelerator pedal position and brake pedal position, and are compared to the actual variables. If the system deviation exceeds a specified threshold, then the driving dynamics control intervenes in the driving operation and produces a compensating yaw moment, which counteracts the yaw movement of the vehicle and straightens out the vehicle according to the setpoint specifications. For this purpose, known driving dynamics control systems usually use the vehicle brakes and/or the engine control as actuators or act on the steering via a steering actuator.

Driving dynamics controllers used today are usually designed in such a way that they brake the inside rear wheel if the vehicle is understeering. This produces a yaw moment in the direction of the inside of the curve, which makes the vehicle attack the curve with more intensity. The vehicle is thus able to follow tighter curve radii. At high driving speeds and correspondingly high transversal accelerations, however, there arises the problem that the inside wheels are greatly relieved of load and are thus only able to take up modest longitudinal forces. As a result it is no longer possible to perform an effective brake intervention on the inside rear wheel.

To improve vehicle stabilization, therefore, an additional controller function (known by acronym EUC) was introduced, which triggers an automatic braking action with the aim of decelerating the vehicle as a whole and to reduce the transverse forces (transversal acceleration). Within the scope of the function, the brake pressure on the wheel brakes of all four wheels is increased equally and the vehicle is decelerated. Braking the wheels, however, initially results in a decrease of the cornering stability potential. Hence there is initially an increased slip at the front wheels and thus an increased understeering of the vehicle. Only when the driving speed has sufficiently decreased is the vehicle again able to follow the steering angle.

BRIEF SUMMARY OF THE INVENTION

It is therefore an objective of the present invention to create a stabilization method and a corresponding device, by which the vehicle speed can be reduced while at the same time maintaining a maximally possible cornering force.

An essential aspect of the present invention lies in the fact that, in an understeering vehicle, the front wheels, which are critical for handling performance when cornering, are not decelerated or decelerated only slightly, while the two rear wheels are decelerated substantially more. According to an example embodiment, the vehicle is decelerated only on the two rear wheels; the front wheels by contrast remaining undecelerated or highly underdecelerated. This has the substantial advantage that the cornering force on the front wheels is preserved and that the vehicle is able to drive a smallest possible curve radius.

The intensity of the brake intervention may be selected as a function of the understeering tendency of the vehicle. This may be ascertained for example from a measured yaw rate and a calculated yaw rate.

The braking torque applied on the rear wheels may be either of equal or of different magnitude. For example, a greater braking torque is applied on the inside rear wheel than on the outside rear wheel so as to produce in an understeering vehicle a counter yaw moment in the direction of the inside of the curve.

In the case of the front wheels, a greater braking torque may also be applied on the inside front wheel than on the outside front wheel so as not to reduce the cornering stability potential of the outside wheel. The outside front wheel has the highest cornering stability potential and is thus especially critical when cornering. It remains underdecelerated or is not decelerated at all during the entire control process.

To detect an understeering driving behavior, the control algorithm calculates an indicator variable, which indicates the understeering tendency. This indicator variable may be a function of the yaw rate, such as a quotient of the yaw rate desired by the driver and a measured yaw rate. The yaw rate desired by the driver results from various variables, in particular the vehicle geometry, the speed and the steering wheel angle, and is calculated in a control unit. The measured yaw rate may be measured by a yaw rate sensor, for example.

The braking function according to the present invention is triggered when the indicator variable exceeds a specified threshold value. The threshold value is a function of the transversal acceleration of the vehicle.

According to an example embodiment of the present invention, after the triggering threshold has been exceeded, setpoint torques for the rear wheels are output to the associated actuators and are adjusted with the aid of a slip control. On the basis of the wheel slip, the algorithm monitors whether the specified setpoint braking torques can in fact be implemented. If wheel slip $\lambda$ on a rear wheel exceeds a specified threshold value, then the non-implementable braking torque is implemented on the corresponding front wheel. For this purpose, only the inside front wheel is decelerated.

A driving dynamics control according to the present invention includes a sensor system for detecting various driving condition variables, a control unit, which processes the sensor signals and which, if a trigger threshold is exceeded, performs an automatic deceleration of the vehicle using the wheel brakes or triggers the wheel brakes in such a way that these perform an automatic deceleration of the vehicle. The control algorithm stored in the control unit is designed in such a way that, when the vehicle is understeered, a higher braking torque is applied on the rear wheels (individually considered or together) than on the front wheels, the outside front wheel in particular remaining highly underdecelerated.

BRIEF DESCRIPTION OF THE SEVERAL VIEWS OF THE DRAWING

FIG. 1 illustrates the cornering behavior of a vehicle having various driving dynamics control systems.

FIG. 2 illustrates the characteristic of various yaw rates when cornering using an understeering vehicle.

DETAILED DESCRIPTION OF THE INVENTION

Figure 3:
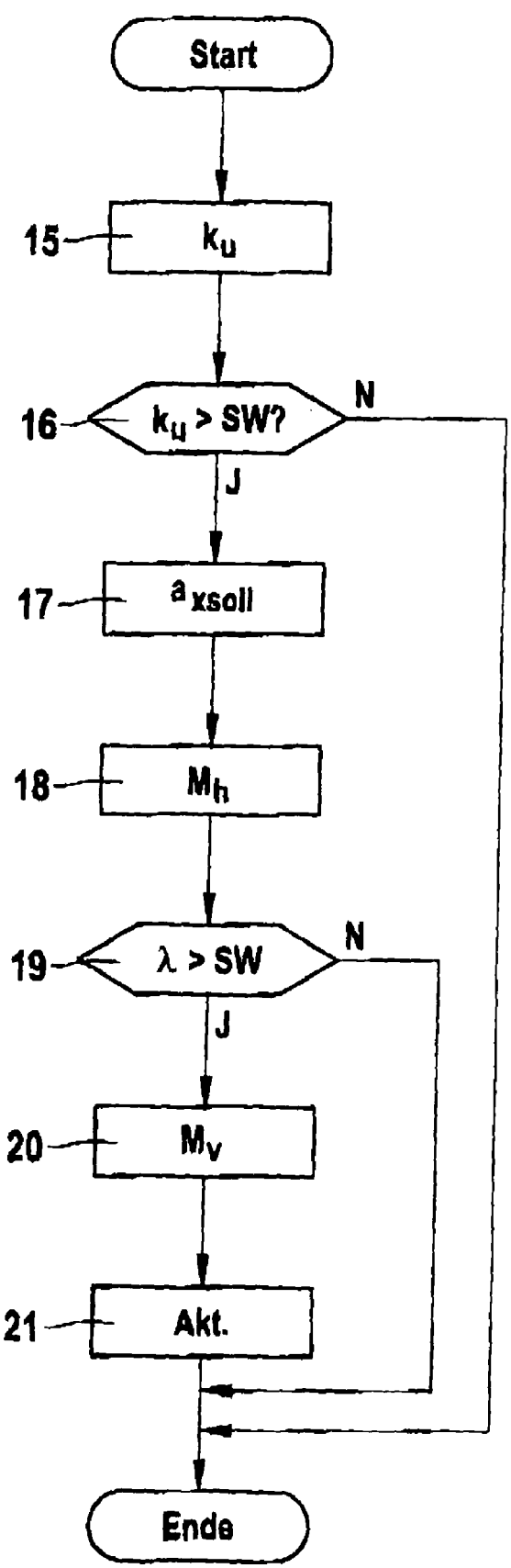
FIG. 3 illustrates the example method steps of a method for braking a vehicle when cornering.

FIG. 1 shows several vehicles 1a-1c, which are equipped with various driving dynamics controllers, in an understeering situation. The driving dynamics controllers use various control strategies in order to keep the vehicles in their lane 3.

The driving dynamics control system of vehicle 1a on the right decelerates the inside rear wheel in order thereby to produce a counter yaw moment in the direction of the inside of the curve. The longitudinal force acting on left rear wheel 6 is represented by an arrow F.

The driving dynamics control system of the center vehicle 1b additionally uses a known function (EUC), which increases the wheel braking pressure on all four wheels 4-7 equally. The braking forces acting on wheels 4-7 are presented by arrows $F_1$ or $F_2$ and $F_3$. Braking force $F_3$ on wheels 4,5 is symmetrical and due to the generally higher braking coefficient (CP) is higher than on the rear axle. On inside rear wheel 6, the braking force is greater than on outside wheel 7 in order, as mentioned above, to produce a counter yaw moment.

Vehicle 1c on the left includes a driving dynamics controller according to the present invention, which in an understeering situation decelerates especially wheels 6,7 of the rear axle. By contrast, front wheels 4,5, which are most important for the cornering behavior of the vehicle, and which must as much as possible absorb high transverse forces, are decelerated only slightly or not at all. This preserves the cornering stability potential of front wheels 4,5 and nevertheless decelerates vehicle 1c such that it is able to follow a smallest possible curve radius.

In the exemplary embodiment shown, all four wheels 4-7 are decelerated to different degrees. Inside rear wheel 6 is decelerated to the highest degree, followed by outside rear wheel 7. The two front wheels 4,5 are decelerated only very slightly, particularly outside front wheel 5 being decelerated only minimally or not at all. With this braking distribution, left vehicle 1c is able to follow a substantially smaller curve radius than the two other vehicles 1a, 1b using known driving dynamics controllers.

FIG. 2 shows the characteristic of various yaw rates during a cornering maneuver, in which vehicle 1c is understeering. In this instance, curve 8 shows the characteristic of a setpoint yaw rate, which represents the driver input. As can be seen, the driver increasingly steers the steering wheel until reaching a maximum steering wheel angle. Curve 9 shows the maximum yaw rate that is achievable under the specified driving conditions (vehicle, tires, road surface, speed, etc.). This line should be reached with the aid of an optimized driving dynamics control. Curve 10 shows a yaw rate actually measured while cornering. As can be seen, the measured yaw rate is partly distinctly lower than maximum possible yaw rate 9. In this area, vehicle 1 drifts unnecessarily far into the direction of the outside of the curve.

FIG. 3 shows the essential method steps of a method for braking a vehicle in an understeering situation. For this purpose, the algorithm in step 15 first calculates an understeering indicator $k_U$, which indicates an understeering tendency of vehicle 1c. In simplified terms, for the indicator:

$$k_U = \frac{\psi_{soll}}{\psi_{mess}}$$

$\psi_{soll}$=f(vehicle geometry, Lw, $V_{Fzg}$)

In this instance, $\psi_{soll}$ is a setpoint yaw rate, which results from the vehicle geometry, the vehicle speed $v_{Fzg}$ and the steering wheel angle Lw, and which represents the driver input. $\psi_{mess}$ is a measured yaw rate.

If this quotient exceeds a specified transversal acceleration-dependent threshold value SW (step 16), then the braking function according to the present invention is automatically activated. For this purpose, in step 17, first a setpoint deceleration $a_{xsoll}$ is calculated, which is a function of understeering tendency $k_U$ and of the accelerator pedal position. Therefore:

$a_{xsoll}$=$f(k_U$, accelerator pedal position)

This yields the wheel braking torques for rear wheels 4,5 and, possibly also for front wheels 6,7. Initially, until the slip limit on one wheel is reached, for the rear wheels:

$$M_h = \frac{m_{Fzg} \cdot a_{xsoll} \cdot r_{Rad}}{2}$$

The torques calculated in step 18 are output as setpoint torques for rear wheels 6,7 and are adjusted with the aid of a slip control. On the basis of wheel slip λ, the algorithm monitors in step 19 whether the specified setpoint braking torques $M_h$ can in fact be implemented. If wheel slip λ exceeds (J) a specified threshold value SW, then the non-implementable braking torque is implemented on the corresponding front wheel. For this purpose, preferably only inside front wheel 4 (step 20) is decelerated. Otherwise (N), the function is terminated. Generally, the individual wheel torques are distributed in such a way that on the whole either no yaw moment or a yaw moment in the direction of the inside of the curve results.

Figure 4:
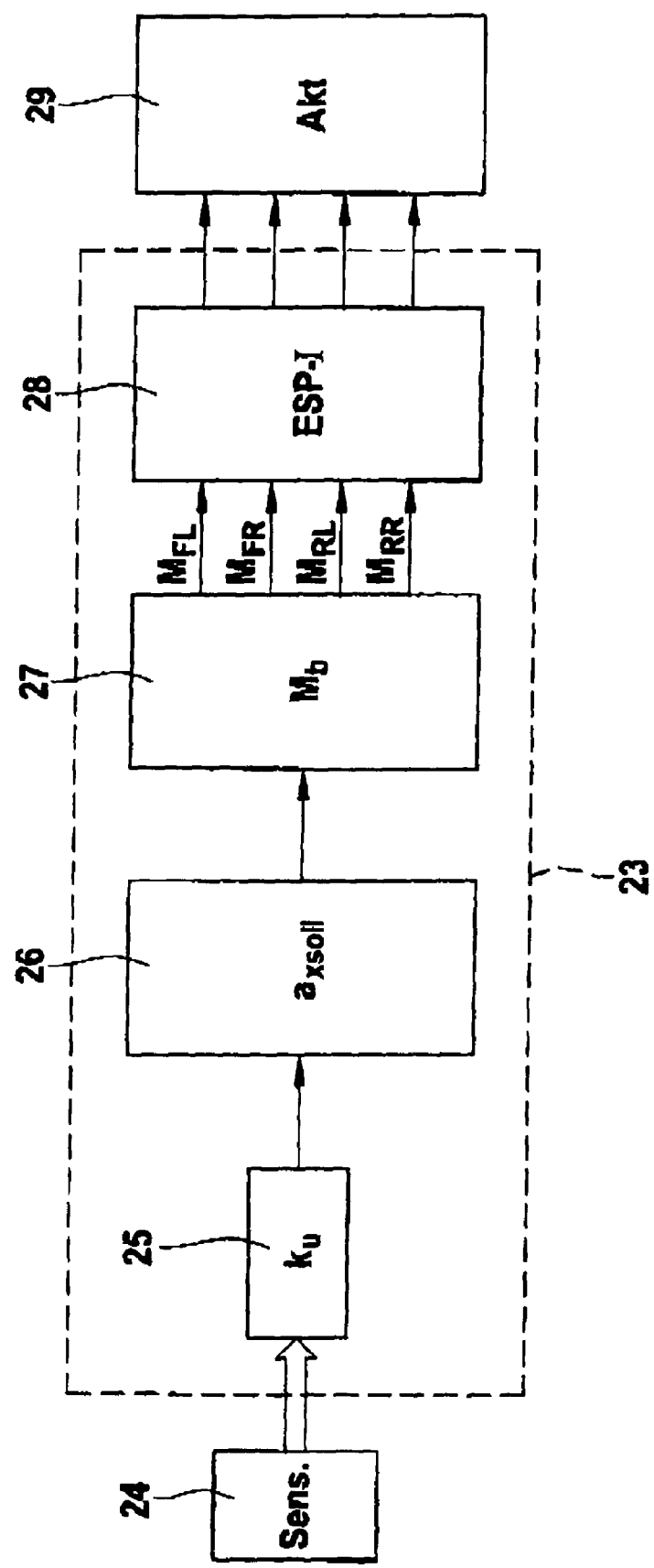
FIG. 4 shows a block diagram of a driving dynamics control system having an expanded braking function.

FIG. 4 shows a system for implementing an automatic braking process in an understeering situation. The system essentially includes a control unit 23, in which the braking function is stored as an algorithm, a sensor system 24 for recording various driving condition variables, and actuators 29 of the motor vehicle braking system, which are triggered by control unit 23.

The algorithm stored in control unit 23 includes a unit 25 for calculating indicator variable $k_U$, a unit 26 for calculating a setpoint deceleration, and a unit 27, which calculates wheel braking torques $M_{FL}$, $M_{FR}$, $M_{RL}$, $M_{RR}$ for the individual wheels as a function of the setpoint deceleration. The braking torques are output to the individual braking actuators 29 via an interface 28.

The device works as was explained above with reference to FIG. 3.

What is claimed is:

1. A computer-implemented method for stabilizing a vehicle in an unstable driving situation, wherein the unstable driving situation includes understeering while cornering, the method comprising:

triggering, by a computer processor, at least one actuator for braking a plurality of wheels of the vehicle in order to reduce a driving speed of the vehicle, such that a braking torque applied to at least one rear wheel of the vehicle is greater than a braking torque applied to at least one front wheel of the vehicle;

wherein the computer processor initially calculates a braking torque for application to the at least one rear wheel, and, when a wheel slip of the at least one rear wheel exceeds a threshold slip value, a portion of the braking torque calculated for application to the at least one rear wheel that exceeds the threshold slip value is applied to the at least one front wheel.

2. The method as recited in claim 1, wherein a braking torque is applied to two rear wheels of the vehicle, and wherein the braking torque applied to the two rear wheels is greater than the braking torque applied to the at least one front wheel.

3. The method as recited in claim 1, wherein a braking torque applied to an inside front wheel is greater than a braking torque applied to an outside front wheel while cornering.

4. The method as recited in claim 1, wherein no braking torque is applied to an outside front wheel while cornering.

5. The method as recited in claim 4, wherein a braking torque greater than zero is applied to an inside front wheel while cornering.

6. The method as recited in claim 1, further comprising:
calculating, by a control unit, an indicator variable indicating an understeering tendency of the vehicle.

7. The method as recited in claim 6, wherein the indicator variable is calculated as a function of a yaw rate of the vehicle desired by a driver and a measured yaw rate of the vehicle.

8. The method as recited in claim 1, wherein the portion of the braking torque calculated for application to the at least one rear wheel that exceeds the threshold slip value is applied to an inside front wheel.

* * * * *